US 8,485,333 B2

(12) United States Patent
Hogberg et al.

(10) Patent No.: US 8,485,333 B2
(45) Date of Patent: Jul. 16, 2013

(54) ACTUATION DEVICE FOR A DUAL CLUTCH TRANSMISSION

(75) Inventors: Joakim Hogberg, Vanersborg (SE); Uwe Krist, Kelsterbach (DE); James M. Partyka, Clarkston, MI (US); Robert Neil Paciotti, White Lake, MI (US); Stefan Gebert, Sonnefeld (DE); Jurgen Ryba, Reckendorf (DE)

(73) Assignee: GM Global Technology Operations LLC, Detroit, MI (US)

( * ) Notice: Subject to any disclaimer, the term of this patent is extended or adjusted under 35 U.S.C. 154(b) by 232 days.

(21) Appl. No.: 12/855,815

(22) Filed: Aug. 13, 2010

(65) Prior Publication Data

US 2011/0094845 A1    Apr. 28, 2011

Related U.S. Application Data

(60) Provisional application No. 61/237,106, filed on Aug. 26, 2009.

(51) Int. Cl.
| F16D 21/00 | (2006.01) |
| F16D 23/00 | (2006.01) |
| F16D 25/10 | (2006.01) |
| F16D 25/12 | (2006.01) |

(52) U.S. Cl.
USPC .................................. 192/48.607; 192/30 W

(58) Field of Classification Search
USPC .......................... 192/48.607, 30 W
See application file for complete search history.

(56) References Cited

U.S. PATENT DOCUMENTS

| 4,650,054 | A | | 3/1987 | Fadler |
| 4,705,151 | A | * | 11/1987 | Leigh-Monstevens et al. .................. 192/111.12 |
| 4,723,643 | A | * | 2/1988 | Numazawa et al. ............. 477/78 |
| 5,287,951 | A | * | 2/1994 | Voit et al. .................... 192/85.54 |
| 6,328,148 | B2 | * | 12/2001 | Winkelmann et al. ...... 192/85.51 |
| 6,502,682 | B2 | * | 1/2003 | Koschmieder et al. ..... 192/85.54 |
| 6,659,252 | B2 | * | 12/2003 | Heller ......................... 192/85.51 |
| 6,857,513 | B2 | * | 2/2005 | Tornatore et al. ........... 192/48.91 |
| 7,246,692 | B2 | * | 7/2007 | Braford ...................... 192/48.611 |
| 7,287,634 | B2 | * | 10/2007 | Agner et al. .............. 192/48.603 |
| 7,322,455 | B2 | * | 1/2008 | Vetter et al. ................. 192/48.9 |
| 7,392,890 | B2 | * | 7/2008 | Agner ............................ 192/48.8 |
| 2011/0079481 | A1 | * | 4/2011 | Carey et al. .............. 192/48.611 |
| 2011/0094845 | A1 | * | 4/2011 | Hogberg et al. ........... 192/48.61 |

FOREIGN PATENT DOCUMENTS

| DE | 602004001215 T2 | 3/2007 |
| EP | 0185176 * | 6/1986 |

OTHER PUBLICATIONS

Machine translation of EP0185176.*

* cited by examiner

Primary Examiner — David D Le
Assistant Examiner — Colby M Hansen

(57) ABSTRACT

A dual clutch actuation device generates the axial compression force required to compress a first and second set of frictional elements of a dual clutch module. Dual clutch actuation device includes a first and second annular piston. The annular pistons include a first end that is in contact with annular bearing assemblies. The annular bearing assemblies are in contact with actuation levers that are in contact with the first set of frictional elements. The annular pistons are arranged in concentric annular piston slots. Together the piston and annular slots form annular piston chambers. The piston chambers are filled with hydraulic fluid. When the hydraulic fluid is pressurized the pistons slide out of the annular slots and apply a force on the actuation levers which in turn apply an axial compression force on the frictional elements.

14 Claims, 4 Drawing Sheets

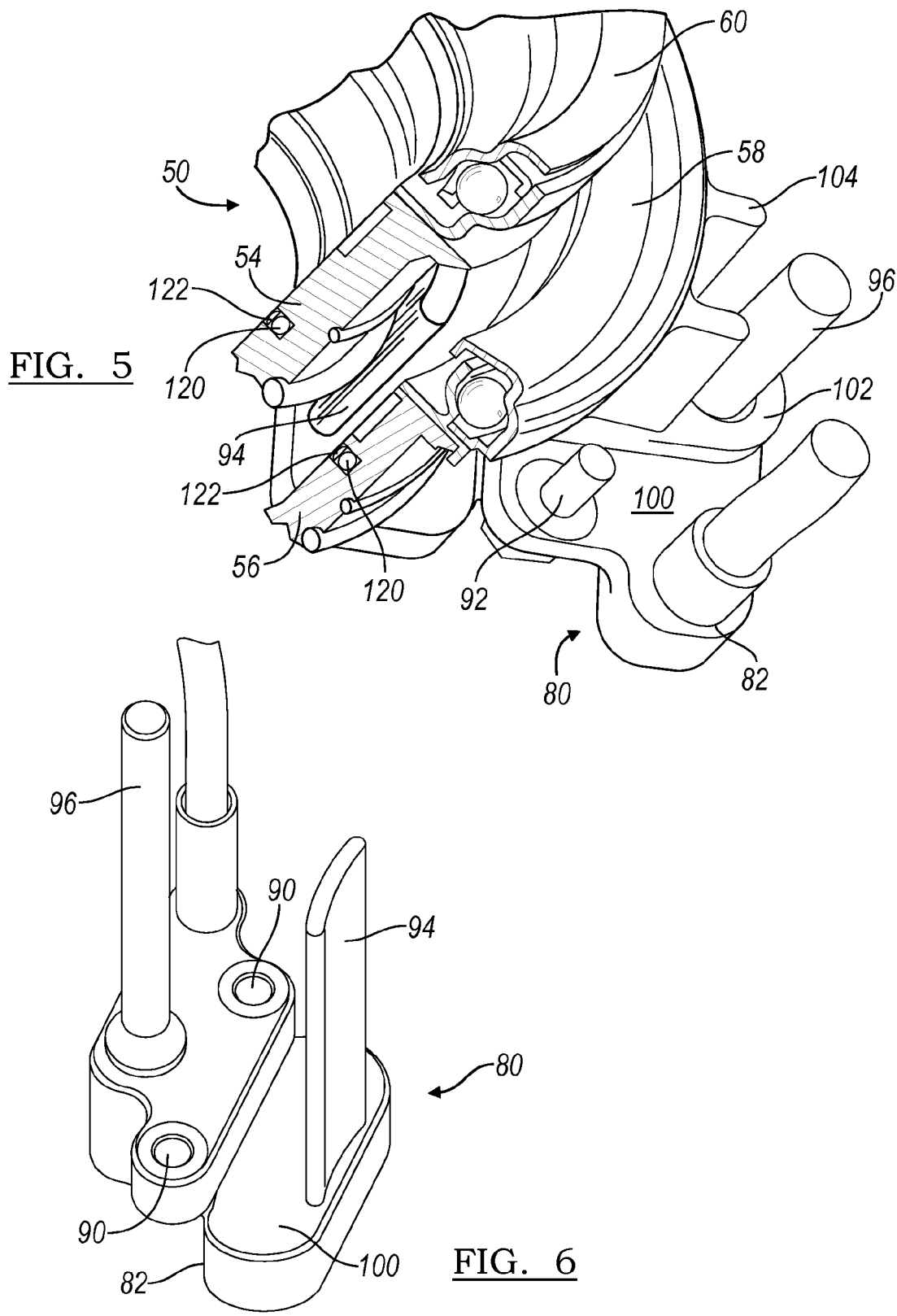

ACTUATION DEVICE FOR A DUAL CLUTCH TRANSMISSION

CROSS-REFERENCE TO RELATED APPLICATIONS

This application claims the benefit of U.S. Provisional Application No. 61/237,106, filed on Aug. 26, 2009, which is hereby incorporated in its entirety herein by reference.

TECHNICAL FIELD

The present disclosure relates to transmissions and more particularly to a dual clutch actuation device for a compact, dual clutch multiple speed transmission.

BACKGROUND

The statements in this section merely provide background information related to the present disclosure and may or may not constitute prior art.

A typical dual input multiple speed transmission has a first input shaft and a second input shaft that is a hollow sleeve shaft that is concentric with the first input shaft. The first and second input shafts are selectively coupled to the engine crankshaft through a dual clutch. The dual or twin clutch has two independent clutch units that are each separately rotationally fixed to one of the input shafts. The clutch units include friction elements that are axially compressed against friction elements that are ultimately rotationally fixed to the crankshaft. A dual clutch actuation device generates the apply force necessary to axially compress the friction elements and rotationally couple the input shafts with the crankshaft.

While current dual clutch actuation devices achieve their intended purpose, the need for new and improved configurations which exhibit improved performance, especially from the standpoints of efficiency, responsiveness and smoothness and improved packaging, primarily reduced size and weight, is essentially constant. Accordingly, there is a need in the art for a transmission having improved packaging while providing desirable gear ratios and torque ranges.

SUMMARY

The present invention provides a dual clutch actuation device for a dual clutch transmission. The transmission has two input shafts a first shaft and a second shaft that is a hollow sleeve shaft. The second shaft is concentric with the first shaft. A dual clutch having two clutch units selectively couples a crankshaft of an engine to one of the two input shafts. More specifically, the dual clutch includes members such as a clutch housing having a first set of frictional elements that are rotationally fixed to the crankshaft through a flywheel and other members such hubs having a second set of frictional elements that are rotationally fixed to the input shafts. The first and second frictional elements are axially compressed against each other to couple one of the hubs to the dual clutch housing, thereby transmitting torque from the crankshaft to one of the input shafts. A dual clutch actuation device is provided to generate the axial compression force required to compress the first and second set of frictional elements. Dual clutch actuation device includes a first and second annular piston. The annular pistons include a first end that is in contact with annular bearing assemblies. The annular bearing assemblies are in contact with actuation levers that are in contact with the first set of frictional elements. The annular pistons are arranged in concentric annular piston slots. Together the piston and annular slots form annular piston chambers. The piston chambers are filled with hydraulic fluid. When the hydraulic fluid is pressurized the pistons slide out of the annular slots and apply a force on the actuation levers which in turn apply an axial compression force on the frictional elements.

In one aspect of the present invention, the dual clutch actuation device includes a housing having a first annular slot that is radially inward of a second annular slot.

In another aspect of the present invention, the dual clutch actuation device includes a housing having a central bore concentric with the annular slots and inward of the first annular slot.

In yet another aspect of the present invention, the dual clutch actuation device includes a position sensor attached to the housing of the actuation device.

In yet another aspect of the present invention, a position sensor includes two sensing elements, one for sensing the position of the first annular piston and the other for sensing the position of the second annular piston.

The above features and advantages and other features and advantages of the present invention are readily apparent from the following detailed description of the best modes for carrying out the invention when taken in connection with the accompanying drawings.

BRIEF DESCRIPTION OF THE DRAWING

FIGS. 5 and 6 are perspective views of a sensor for sensing the position of the actuation device shown in FIGS. 2A. and 2B., in accordance with an embodiment of the present invention.

DESCRIPTION

Figure 1:
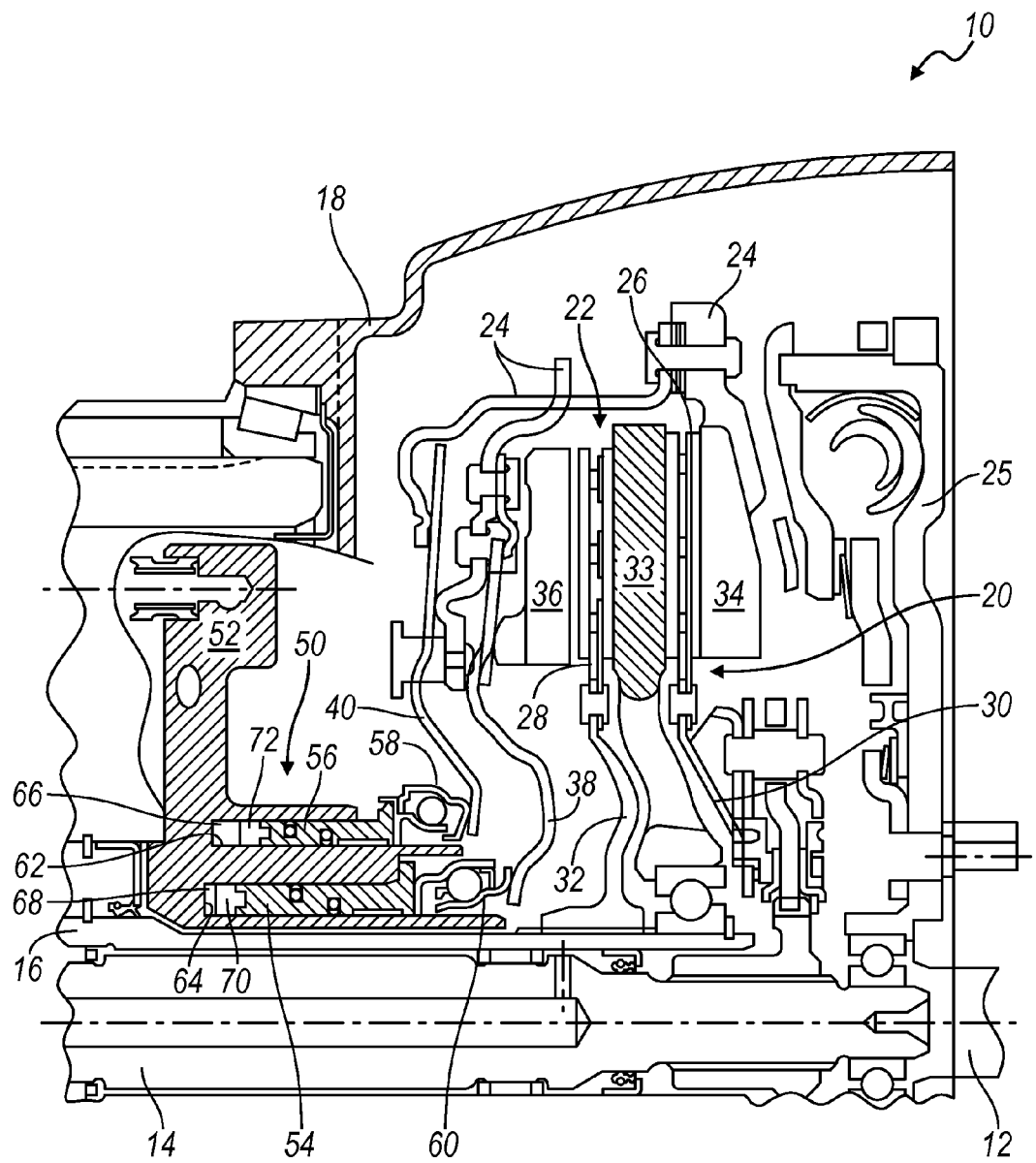
FIG. 1 is a partial cross-sectional view of a torque transmitting device for a dual input transmission, in accordance with an embodiment of the present invention.

Referring to FIG. 1, a partial cross-sectional view of a torque transmitting device for a dual input transmission (not shown) is generally indicated by reference number 10. The torque transmitting device 10 is for example a dual clutch disposed in a vehicle powertrain. Typically the vehicle powertrain includes an engine and a transmission. In the instant embodiment the transmission includes is a dual input transmission where torque is transferred from the engine via a crankshaft 12 to two input shafts in the transmission: a first input shaft 14 and a second input shaft 16 through selective operation of torque transmitting device 10. The second input shaft 16 is a sleeve (or hollow) shaft that is concentric with and overlies the first input shaft 14. Torque transmitting device 10 is disposed in a transmission housing or bell housing 18

Torque transmitting device 10 has two separate and independent friction clutches 20 and 22 disposed in a clutch housing 24. Clutch housing 24 is rotationally fixed to a flywheel 25. Flywheel 25 is connected to crankshaft 12 and is preferably a dual mass flywheel that is configured to dampen and reduce vibration in the crankshaft 12. Friction clutches 20 and 22 each include friction members 26 and 28. Friction members 26 and 28 are fixed to hub members 30 and 32, respectively. Hub members 30 and 32 are each rotationally fixed to first and second input shafts 14 and 16, respectively. Clutch housing 24 also includes a center plate 33 supported by a bearing and friction elements 34 and 36 that are attached and rotationally fixed to housing 24. Friction members 26 and 28 and friction elements 34 and 36 are configured to form a friction clutch, as is known in the art as a dual clutch. Thus, selective engagement through axial compression of friction member 26 with friction element 34 connects the crankshaft 12 for common rotation with the first input shaft 14. Selective engagement of friction member 28 with friction element 36 connects the crankshaft 12 for common rotation with the second input shaft 16. Friction clutches 20 and 22 may include multiple friction members 26 and 28 that interact with a respective multiple of friction elements 34 and 36 connected to housing 24. The number and size of the friction members will vary based on appropriate torque transmission requirements. Of course, the torque transmission capability of device 10 may be varied by varying the number of friction elements and amount of surface area of each friction element.

The coupling of the crankshaft 12 to the input shafts 14 and 16 is achieved through axial compression of the friction elements by actuation levers 38 and 40. Actuation levers 38, 40 have a first end 42 that is in contact with and configured to pivot on housing 24. The second ends 44 are in contact with and configured to receive an apply force generated by an actuation device 50.

Referring now to FIGS. 1 through 4, actuation device 50 includes an annular housing 52, a pair of annular pistons 54 and 56 and a pair of bearing assemblies 58 and 60. Housing 52 is mounted and thus rotationally fixed to bell housing 18 and defines a central bore 61, a pair of annular slots 62 and 64. The central bore 61 is sized to allow the first input shaft 14 and the second input shaft 16 to pass there through. Annular slot 62 is concentric with and disposed radially inward of annular slot 64. The annular pistons 54 and 56 are configured to slide axially within the slots and form piston chambers 66 and 68 therewith. Annular pistons 54 and 56 further include seals 70 and 72, respectively, fixed to an end of pistons 54 and 56. Seals 70 and 72 are configured to prevent excessive leakage of hydraulic fluid between a wall of the piston chambers 66 and 68 and the ends of the pistons. Piston chambers 66 and 68 are filled with hydraulic fluid through clutch feed bores 74 and 76. Bearing assemblies 58 and 60 are actuation bearings that tortionally decouple the rotating elements of clutch 10 (i.e. housing 24 and actuation levers 38 and 40) from the non-rotating members of the actuation device 50 (i.e. pistons 54 and 56).

Figure 2A:
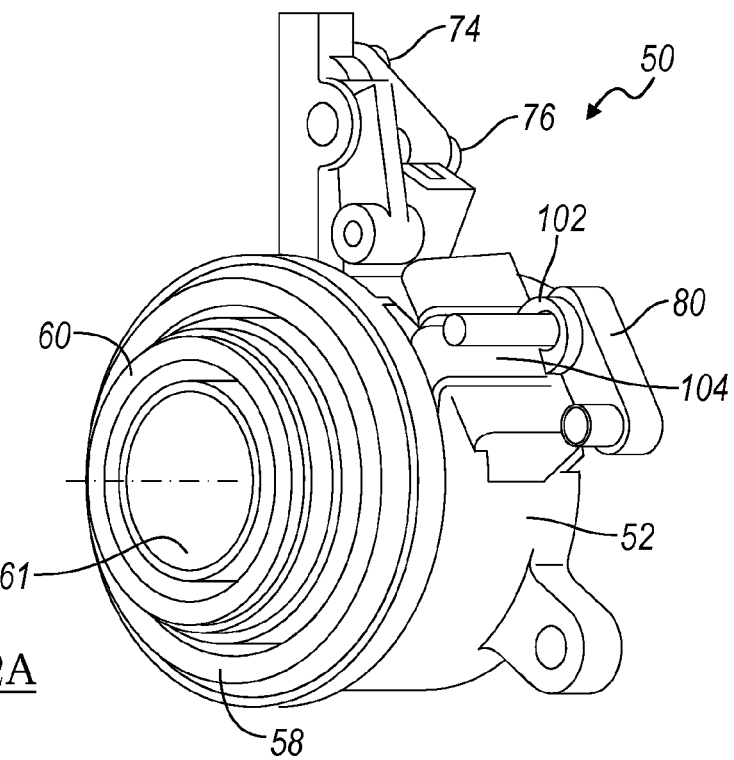
FIG. 2A is a perspective view of front side of an actuation device for activating the torque transmitting device of FIG. 1., in accordance with an embodiment of the present invention.
Figure 2B:
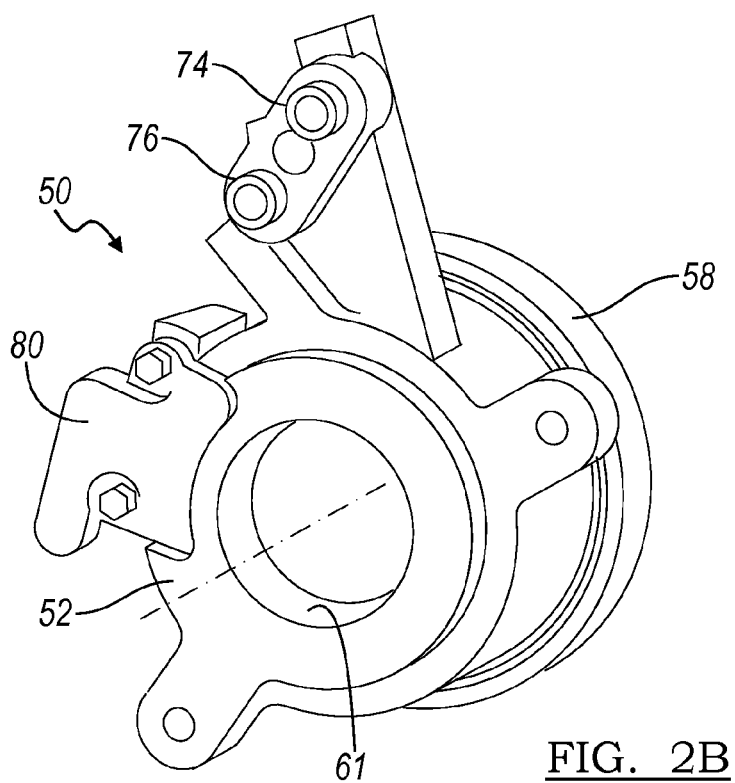
FIG. 2B is a perspective view of back side an actuation device for activating the torque transmitting device of FIG. 1., in accordance with an embodiment of the present invention.
Figure 3:
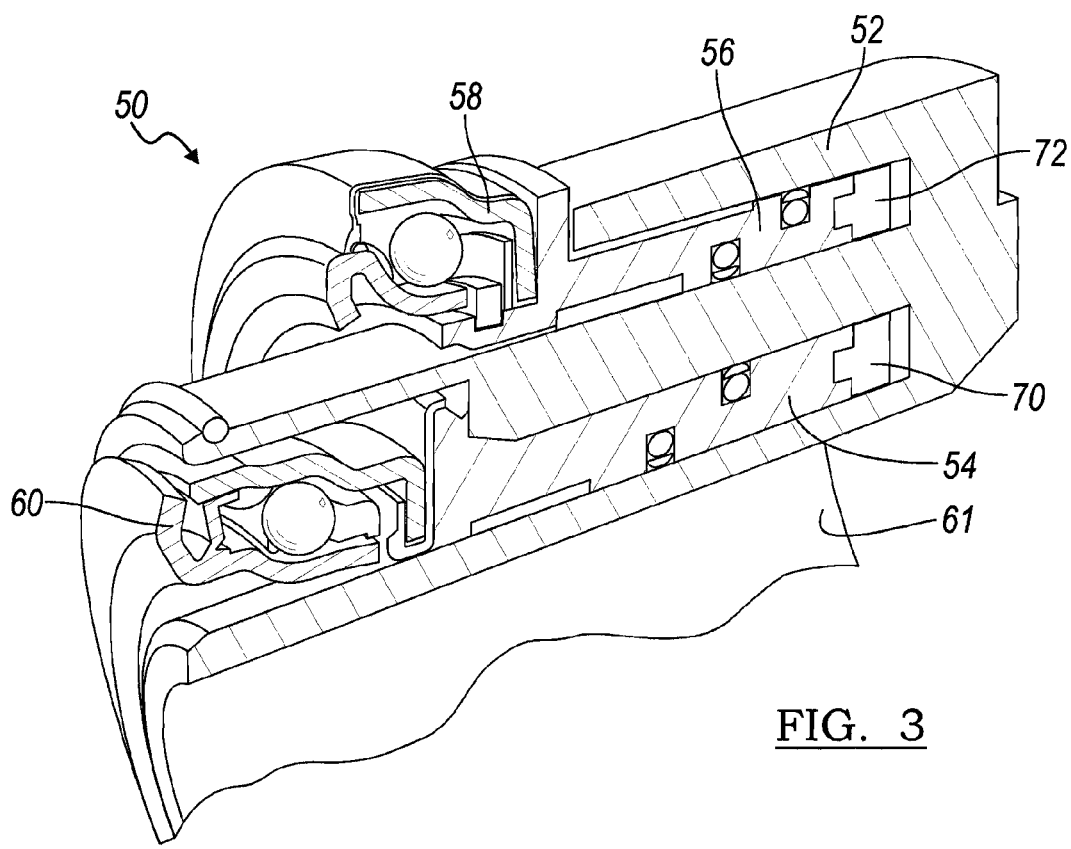
FIG. 3 is a partial cross-sectional view of the actuation device of FIGS. 2A. and 2B., in accordance with an embodiment of the present invention.
Figure 4:
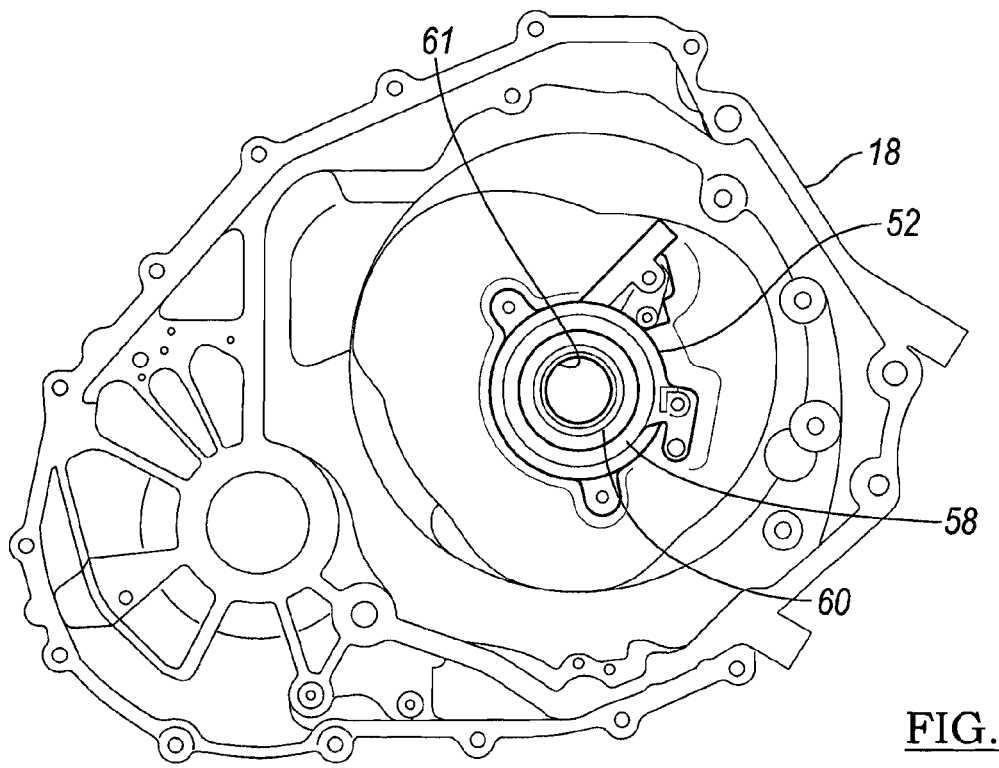
FIG. 4 is a front view of the actuation device of FIGS. 2A. and 2B. attached to a wall of the housing of a transmission, in accordance with an embodiment of the present invention.

With continuing reference to FIGS. 2A, 2B and now referring to FIGS. 5 and 6, position sensor 80 is fixed to housing 52 for sensing the movement and location of annular pistons 54 and 56. Position sensor 80 includes a sensor housing 82 having a pair of apertures 90 formed therein. Housing 52 includes mounting pins 92 attached to a side of housing 52 that cooperate with apertures 90 formed in sensor 80. The engagement of pins 92 with apertures 90 insures the required orientation and location of sensor 80 relative to annular pistons 54 and 56. More specifically, position sensor 80 includes first and second sensing elements 94 and 96. First and second sensing elements 94 and 96 extend perpendicular to a base 100 of sensor housing 82. First sensing element 94 is disposed between annular pistons 54 and 56 and is configured to sense the movement and position of piston 54. Second sensing element 96 is disposed radially outside of annular pistons 54 and 56 and is configured to sense the movement and position of piston 56. Second sensing element 96 is threaded through an annular ring 102 in a bracket 104 that is fixed to piston 56. The axial movement of ring 102 along sensing element 96 alters the electrical properties of sensor element 96 and generates signal in sensor 80 indicative of a position of piston 58. Sensor 80 is any suitable sensor including Hall Effect sensors, variable reluctance sensors and the like.

In operation hydraulic fluid is pressurized and forced through clutch feed bores 74 and 76 to push pistons 54 and 56 out of their respective piston chambers 66 and 68 towards clutch 10. More specifically, pressurized hydraulic fluid is pushed through clutch feed bore 74 into piston chamber 66 forcing annular piston 56 to slide out of the chamber towards clutch 10. As annular piston 56 moves out of the chamber bearing assembly 58 which is in contact with annular piston 56 applies a force to one end of the actuation lever 40. Actuation lever 40 in turn compresses friction element 34 axially against friction member 26 causing friction member 26 to rotate at substantially the same speed as friction element 34. Thus, selectively rotationally coupling crankshaft 12 with first input shaft 14. Similarly, pressurized hydraulic fluid is pushed through clutch feed bores 76 into chamber 68 forcing annular piston 54 to slide out of the chamber towards clutch 10. As annular piston 54 moves out of the chamber bearing assembly 60 which is in contact with annular piston 54 applies a force to one end of the actuation lever 38. Actuation lever 38 in turn compresses friction element 36 axially against friction member 28 causing friction member 28 to rotate at substantially the same speed as friction element 36. Thus, selectively rotationally coupling crankshaft 12 with second input shaft 16.

While the best modes for carrying out the invention have been described in detail, those familiar with the art to which this invention relates will recognize various alternative designs and embodiments for practicing the invention within the scope of the appended claims.

The invention claimed is:

1. A dual clutch actuation device for actuating a dual clutch in a dual clutch transmission, the dual clutch actuation device comprising:
   a housing fixedly secured to the dual clutch transmission, wherein the housing includes a base portion, an inner annular portion extending from the base portion, an outer annular portion extending from the base portion, and an middle annular portion extending from the base portion and disposed between the inner and outer annular portions, and the inner annular portion combines with the middle annular portion to define a first annular slot and the outer annular portion combines with the middle annular portion to define a second annular slot;
   a first annular piston at least partially slidably disposed in the first annular slot, wherein the first annular piston includes an axially facing first end and a second end opposite the first end, and a first annular end seal fixedly secured to the first end of the first annular piston;
   a second annular piston at least partially slidably disposed in the second annular slot, wherein the second annular piston includes an axially facing first end and a second end opposite the first end, and a second annular end seal fixedly secured to the first end of the second annular piston;

a first annular piston chamber defined by the first annular slot and the first annular piston, wherein the first annular piston chamber is filled with a hydraulic fluid;

a second annular piston chamber defined by the second annular slot and the second annular piston, wherein the second annular piston chamber is filled with the hydraulic fluid;

a position sensor attached to the housing of the actuation device and having a first and a second sensing element, and wherein the a first sensing element is disposed in the middle annular portion of the housing and the second sensing element is disposed radially adjacent to the outer annular portion of the housing;

a first annular bearing assembly having a first race in contact with the first annular piston and a second race in communication with one of the clutches of the dual clutch; and a second annular bearing assembly in contact with the second annular piston with the second annular piston and a second race in communication with the other of the clutches of the dual clutch, and wherein the dual clutch is actuated by independently pressurizing the hydraulic fluid in at least one of the first and second annular piston chambers forcing at least one of the first and second annular pistons to slide out of the first and second annular slots.

2. The dual clutch actuation device of claim 1, wherein the housing has a central bore concentric with the first and second annular slots and inward of the first annular slot.

3. The dual clutch actuation device of claim 1 wherein the second annular piston includes a bracket disposed proximate the second end of the second annular piston, the bracket extends axially toward the base portion of the housing radially adjacent to the outer annular portion of the housing, the bracket includes a flange having an axial bore, and the second sensing element of the position sensor is further disposed in the bore of the bracket of the second annular piston.

4. The dual clutch actuation device of claim 3, wherein the position sensor includes a base, the first sensing element has an arcuate cross section and extends axially from the base of the position sensor.

5. The dual clutch actuation device of claim 4, wherein the base of the piston sensor includes a pair of apertures for mounting the piston sensor to the housing.

6. The dual clutch actuation device of claim 5, wherein the housing includes a pair of pins disposed in the apertures of the position sensor.

7. The dual clutch actuation device of claim 1, wherein the second annular slot is concentric with and radially inward of the first annular slot.

8. A dual clutch actuation device for actuating a dual clutch in a dual clutch transmission, wherein each clutch of the dual clutch includes frictional members and actuation levers and wherein the actuation levers apply an axial compression force on the frictional members, the dual clutch actuation device comprising:

a housing fixedly secured to the dual clutch transmission and defining first and second annular slots, wherein the second annular slot is concentric with and radially inward of the first annular slot;

a first annular piston having a first and a second end and at least partially slidably disposed in the first annular slot;

a second annular piston having a first and a second end at least partially slidably disposed in the second annular slot;

a first annular piston chamber defined by the first annular slot and the first annular piston, wherein the first annular piston chamber is filled with a hydraulic fluid;

a first annular seal fixedly secured to the first end of the first annular piston for sealing the first annular piston chamber;

a second annular piston chamber defined by the second annular slot and the second annular piston, wherein the second annular piston chamber is filled with the hydraulic fluid;

a second annular seal fixedly secured to the first end of the second annular piston for sealing the second annular piston chamber;

a first annular bearing assembly having a first race in contact with the first annular piston and a second race in communication with one of the actuation levers of one of the clutches of the dual clutch; and a second annular bearing assembly in contact with the second annular piston with the second annular piston and a second race in communication with the other of the actuation levers of the other of the clutches of the dual clutch, a position sensor attached to the housing of the actuation device for sensing the position of the first and the second annular pistons, wherein the position sensor has a base and two sensing elements, one of the sensing elements having a cylindrical shape, an other of the sensing elements having an arcuate cross section, and wherein the dual clutch is actuated by independently pressurizing the hydraulic fluid in the first and second annular piston chambers forcing the first and second annular pistons to slide out of the first and second annular slots and apply a force on at least one of the actuation levers.

9. The dual clutch actuation device of claim 8, wherein the housing has a central bore concentric with the first and second annular slots and inward of the first annular slot.

10. The dual clutch actuation device of claim 8, wherein the one of the sensing elements is for sensing the position of the first annular piston and the other of the sensing elements is for sensing the position of the second annular piston.

11. The dual clutch actuation device of claim 10, wherein the one of the two sensing elements for sensing the position of the first annular piston is disposed radially outward of the first annular chamber.

12. The dual clutch actuation device of claim 10, wherein the other of the two sensing elements for sensing the position of the second annular piston is disposed between of the first and the second annular chambers.

13. The dual clutch actuation device of claim 11 wherein the first annular piston includes a bracket supporting an annular ring, the one of the two sensing elements is threaded through the annular ring, and the annular ring translates with the first annular piston along the length of the one of the two sensing elements which generates a signal indicative of the position of the first annular piston.

14. The dual clutch actuation device of claim 12 wherein the base of the piston sensor includes a pair of apertures for mounting the piston sensor to the housing and the housing includes a pair of pins disposed in the apertures of the position sensor.

* * * * *